(12) United States Patent
Hur et al.

(10) Patent No.: US 10,774,846 B2
(45) Date of Patent: Sep. 15, 2020

(54) PORTABLE, LOW-POWER AIR FILTRATION SYSTEM

(71) Applicant: Design West Technologies, Inc., Tustin, CA (US)

(72) Inventors: Ryan Hur, Irvine, CA (US); Bob Olson, Huntington Beach, CA (US); Jeffrey Kim, Irvine, CA (US); Gary Chen, Chino Hills, CA (US); Ramesh Palanisamy, Riverside, CA (US)

(73) Assignee: Design West Technologies, Inc., Tustin, CA (US)

(*) Notice: Subject to any disclaimer, the term of this patent is extended or adjusted under 35 U.S.C. 154(b) by 452 days.

(21) Appl. No.: 15/625,870

(22) Filed: Jun. 16, 2017

(65) Prior Publication Data

US 2017/0363111 A1  Dec. 21, 2017

Related U.S. Application Data

(60) Provisional application No. 62/351,268, filed on Jun. 16, 2016.

(51) Int. Cl.
| | |
|---|---|
| *F04D 29/70* | (2006.01) |
| *F04D 25/06* | (2006.01) |
| *F04D 25/16* | (2006.01) |
| *F04D 27/00* | (2006.01) |
| *B01D 45/16* | (2006.01) |

(Continued)

(52) U.S. Cl.
CPC .......... *F04D 29/703* (2013.01); *B01D 45/16* (2013.01); *B01D 46/24* (2013.01); *B01D 46/2403* (2013.01); *B01D 46/403* (2013.01); *F04D 19/007* (2013.01); *F04D 25/0606* (2013.01); *F04D 25/08* (2013.01); *F04D 25/166* (2013.01); *F04D 27/004* (2013.01); *F04D 29/602* (2013.01); *B01D 46/0043* (2013.01); *B01D 46/2411* (2013.01); *B01D 50/002* (2013.01);

(Continued)

(58) Field of Classification Search
CPC .......... F04D 3/00–02; F04D 7/00–045; F04D 13/12; F04D 15/0088; F04D 19/00–007; F04D 23/005; F04D 25/12; F04D 27/004; F04D 29/701–703; F04D 17/164; F04D 25/06; F04D 25/0606; F04D 25/0666; F04D 25/08–14; F04D 27/001; F04D 27/007; F04D 27/008; F04D 27/0261; F04D 27/0292; B01D 45/045; B01D 45/16; B01D 46/403; B04C 3/00; B04C 3/06
USPC ... 417/423.1, 423.5, 423.7, 423.14, 430, 63, 417/313
See application file for complete search history.

(56) References Cited

U.S. PATENT DOCUMENTS

| | | | | |
|---|---|---|---|---|
| 2,648,398 | A | * | 8/1953 | Chipley ................. B01D 45/02 55/392 |
| 3,243,102 | A | * | 3/1966 | McMahan ............. F04D 17/165 415/208.2 |

(Continued)

*Primary Examiner* — Alexander B Comley
(74) *Attorney, Agent, or Firm* — Inskeep IP Group, Inc.

(57) ABSTRACT

An air filtration system is described that is suited for CBRN and ColPro applications, and has an integrated inertial particle separator (IPS) and scavenge fan blower as a pre-dust/particle filter, a variable speed fan blower, and a filter housing that mounts two gas-particulate filter sets. The variable speed fan blower, managed by a motor control unit and motor speed algorithm, automatically adjusts its speed to maintain constant air flow regardless of its altitude.

6 Claims, 16 Drawing Sheets

(51) Int. Cl.
  *B01D 46/24* (2006.01)
  *F04D 29/60* (2006.01)
  *F04D 19/00* (2006.01)
  *F04D 25/08* (2006.01)
  *B01D 46/40* (2006.01)
  *F04D 29/40* (2006.01)
  *F04D 29/66* (2006.01)
  *B01D 46/00* (2006.01)
  *B01D 50/00* (2006.01)

(52) U.S. Cl.
  CPC .......... *F04D 19/002* (2013.01); *F04D 29/403* (2013.01); *F04D 29/663* (2013.01)

(56) References Cited

U.S. PATENT DOCUMENTS

| | | | | |
|---|---|---|---|---|
| 3,293,832 A * | 12/1966 | Bjorn | ................ | B01D 45/14 55/407 |
| 3,449,891 A * | 6/1969 | Amelio | ................ | B64D 33/02 55/306 |
| 4,098,594 A * | 7/1978 | Shorr | ................ | B01D 45/06 55/403 |
| 4,971,518 A * | 11/1990 | Florin | ................ | F04D 29/703 415/121.2 |
| 5,555,956 A * | 9/1996 | Voss | ................ | F04D 25/06 184/104.1 |
| 5,746,789 A * | 5/1998 | Wright | ................ | B01D 45/14 210/512.3 |
| 6,296,459 B1 * | 10/2001 | Saputo | ................ | F04D 17/164 415/208.2 |
| 6,428,589 B1 * | 8/2002 | Bair | ................ | A47L 9/1608 15/353 |
| 7,581,397 B2 * | 9/2009 | Strangman | ................ | F04D 29/441 415/121.2 |
| 8,128,888 B2 * | 3/2012 | Bacik | ................ | A61L 2/208 422/29 |
| 8,167,550 B2 * | 5/2012 | Nakamura | ................ | F04D 29/703 415/203 |
| 9,011,767 B2 * | 4/2015 | Wiget | ................ | E04H 1/1277 422/33 |
| 2003/0168064 A1 * | 9/2003 | Daly | ................ | A61M 16/0057 128/204.18 |
| 2003/0223877 A1 * | 12/2003 | Anstine | ................ | F04D 27/004 417/18 |
| 2008/0006250 A1 * | 1/2008 | Bula | ................ | B01D 45/04 123/559.1 |
| 2008/0304986 A1 * | 12/2008 | Kenyon | ................ | A61M 16/0066 417/423.12 |
| 2009/0246013 A1 * | 10/2009 | Kenyon | ................ | A61M 16/0057 415/208.2 |
| 2011/0179763 A1 * | 7/2011 | Rajamani | ................ | B01D 45/14 60/39.092 |
| 2011/0250051 A1 * | 10/2011 | Smiley, III | ................ | F04D 27/001 415/26 |
| 2012/0138051 A1 * | 6/2012 | Curran | ................ | A62B 7/10 128/201.25 |
| 2014/0260129 A1 * | 9/2014 | Rosenfeld | ................ | F02M 35/0215 55/385.1 |
| 2017/0001048 A1 * | 1/2017 | Volmer | ................ | A62B 9/006 |
| 2017/0191503 A1 * | 7/2017 | Pearson | ................ | B01D 45/16 |

* cited by examiner

134

PORTABLE, LOW-POWER AIR FILTRATION SYSTEM

RELATED APPLICATIONS

This application claims priority to U.S. Provisional Application Ser. No. 62/351,268 filed Jun. 16, 2016 entitled Portable, Low-Power Air Filtration System, which is hereby incorporated herein by reference in its entirety.

BACKGROUND OF THE INVENTION

The present invention relates to efficient, low power air filtration for Chemical, Biological, Radiation and Nuclear (CBRN) applications and especially for Collective Protection (ColPro) applications. Filtering for CBRN and/or ColPro applications typically involve the utilization of modular fan blower assemblies that deliver a light-weight, low-power, weather-proof, stackable air filtration system. This system is typically used to pressurize a Toxic Free Area (mobile or permanent shelters) or Chemical Biological liner, which may be placed outside a military shelter to prevent the infiltration of chemical or biological vapors and liquids.

Existing air filtration systems are typically not capable of meeting the performance requirements for the above application, for example, because they are unable to operate at high air flow and static pressure, (400 cfm/15 iwg), or are unable to maintain the low power draw. Hence, an improved air filtration system is needed to address the shortcomings of present systems.

SUMMARY OF THE INVENTION

The present invention is generally directed to an air filtration system that can meet or exceed the above noted limitations, and therefore is better suited for CBRN and ColPro applications. In one embodiment, the air filtration system consists of an integrated inertial particle separator (IPS) and scavenge fan blower as a pre-dust/particle filter, a variable speed fan blower, and a filter housing that mounts two gas-particulate filter sets. The variable speed fan blower, managed by a motor control unit and motor speed algorithm, automatically adjusts its speed to maintain constant air flow regardless of its altitude. When dust accumulates on particulate filters during extended use, a pressure transducer detects increased filter pressure drop, and motor rotational speed automatically increases to maintain the required air flow.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
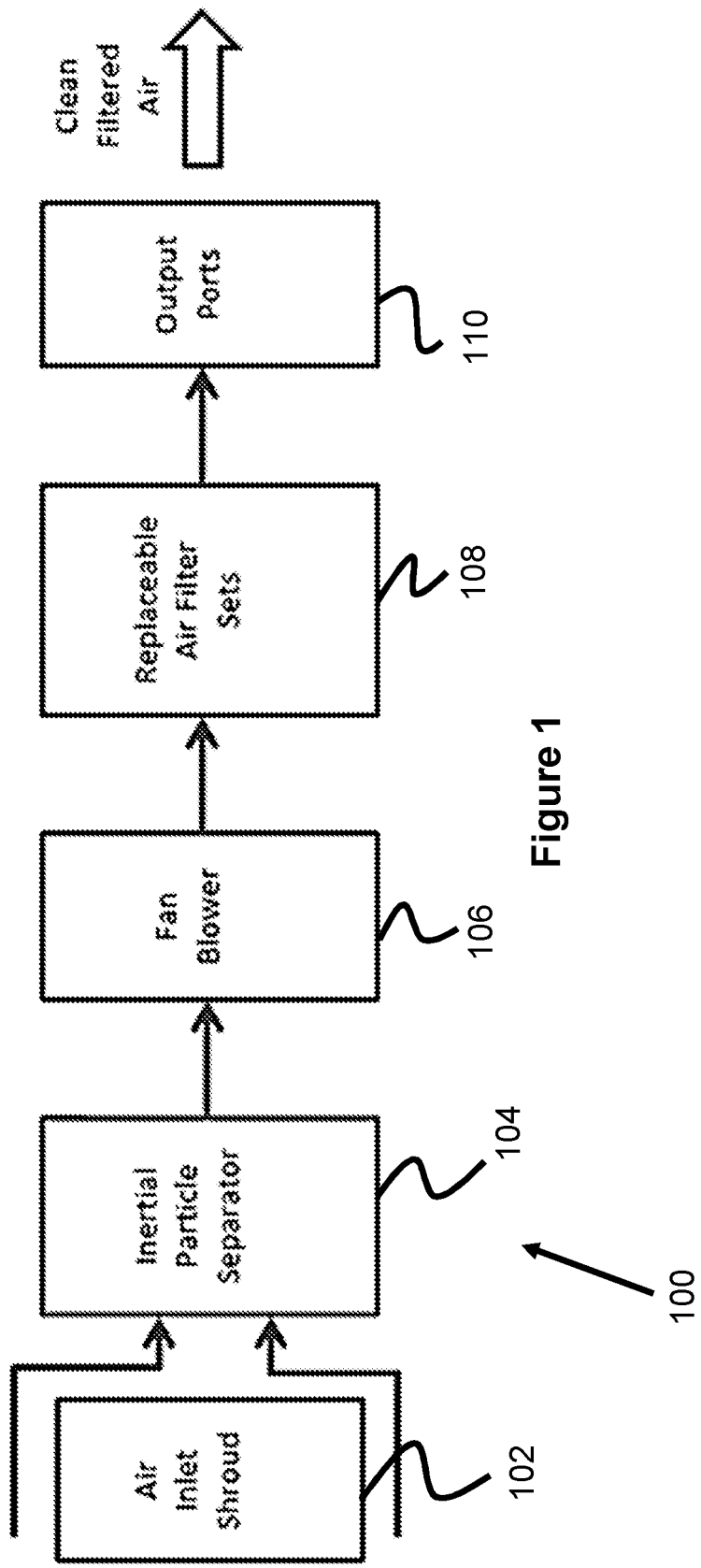
FIG. 1 is an airflow diagram of a fan blower according to the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

In one embodiment, the present invention is directed to an air filtration system comprising a fan blower 100 that, among other uses, is especially capable of CBRN and/or ColPro applications. As seen in FIG. 1, outside air enters the fan blower 100 around the air inlet shroud 102. Next, it enters the inertial particle separator 104 to remove relatively large particle from the outside air. Next, the air passes through the fan blower 106, which is responsible for pulling in the outside air and pushing it through the blower 100. The air then moves through one or more replaceable air filters 108, and finally out through output ports 110.

Figure 2:
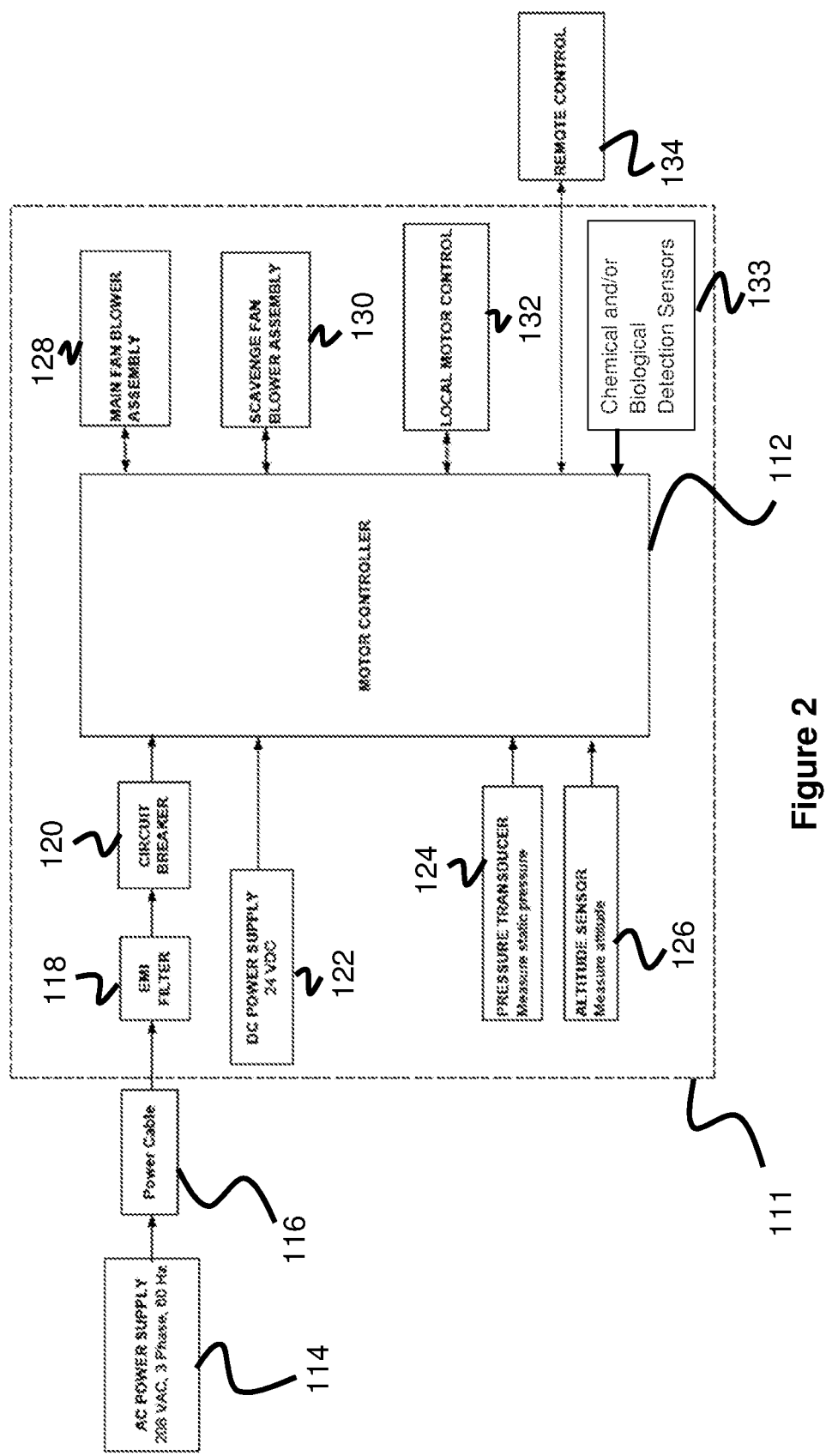
FIG. 2 is a functional diagram of a fan blower assembly control according to the present invention.

The fan blower 100 is controlled by the fan blower control system 111, which is depicted in the functional diagram of FIG. 2. Power is supplied to the control system 111 via an AC power supply 114 (e.g., 208 VAC, 3 Phase, 60 Hz) and power cable 116, which passes through an EMI filter 118 and circuit breaker 120 to the microcontroller 112 (powered by a DC power supply 122). The microcontroller 112 includes software/firmware logic/algorithms that monitor sensor readings, such as those from the pressure transducer 124 (that measures static pressure within the fan blower 100) and from the altitude sensor 126 (that measures the altitude of the fan blower, or alternately may be measured indirectly using an atmospheric pressure sensor), and then controls the main fan blower assembly 128 and scavenge fan blower assembly 130, accordingly. Additionally, the microcontroller 112 accepts local input to control the operation of the fan blower 100 via the local motor control 132 or the remote control 134.

Figure 3:
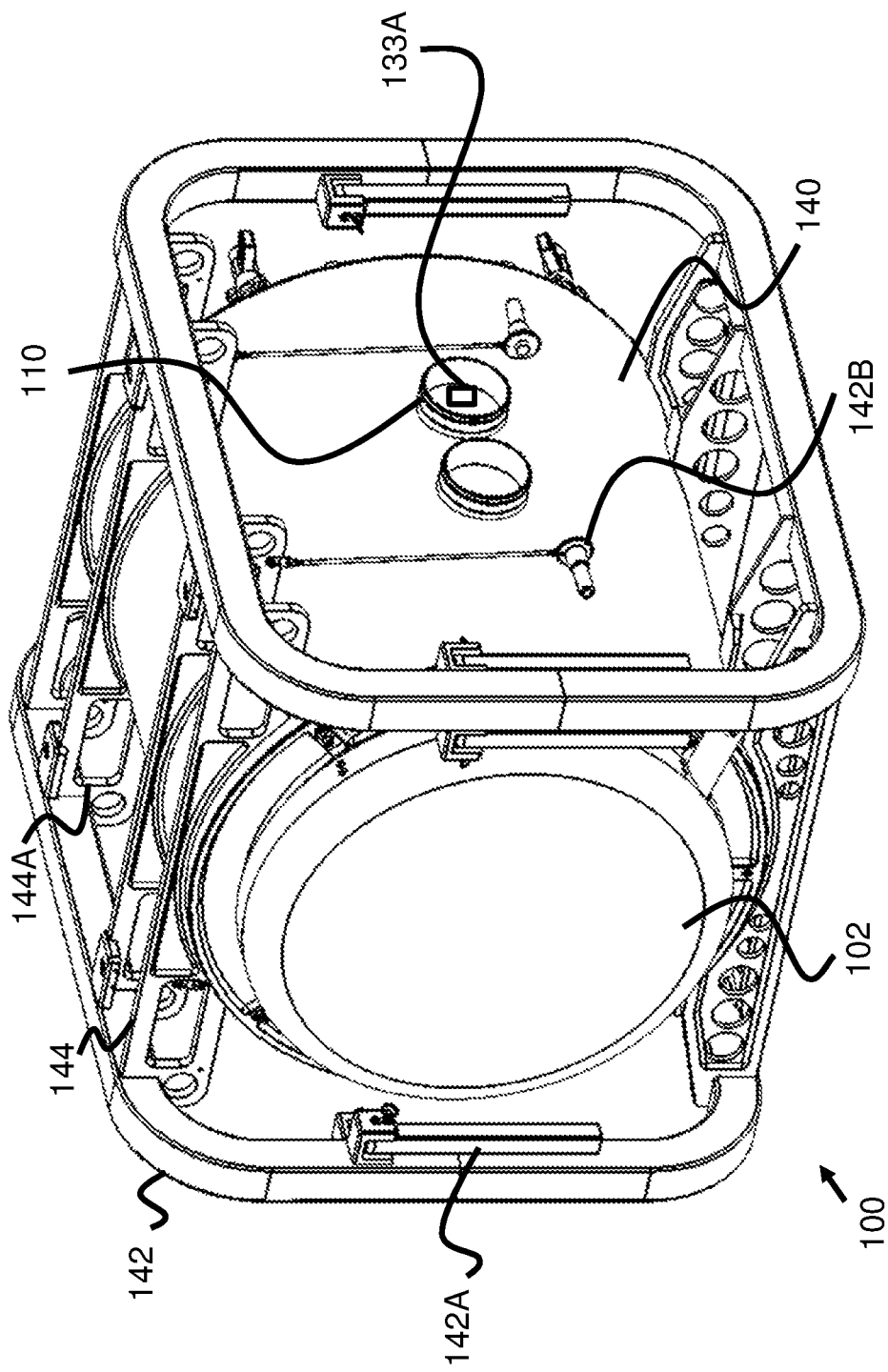
FIG. 3 is a perspective view of a fan blower assembly according to the present invention.
Figure 4:
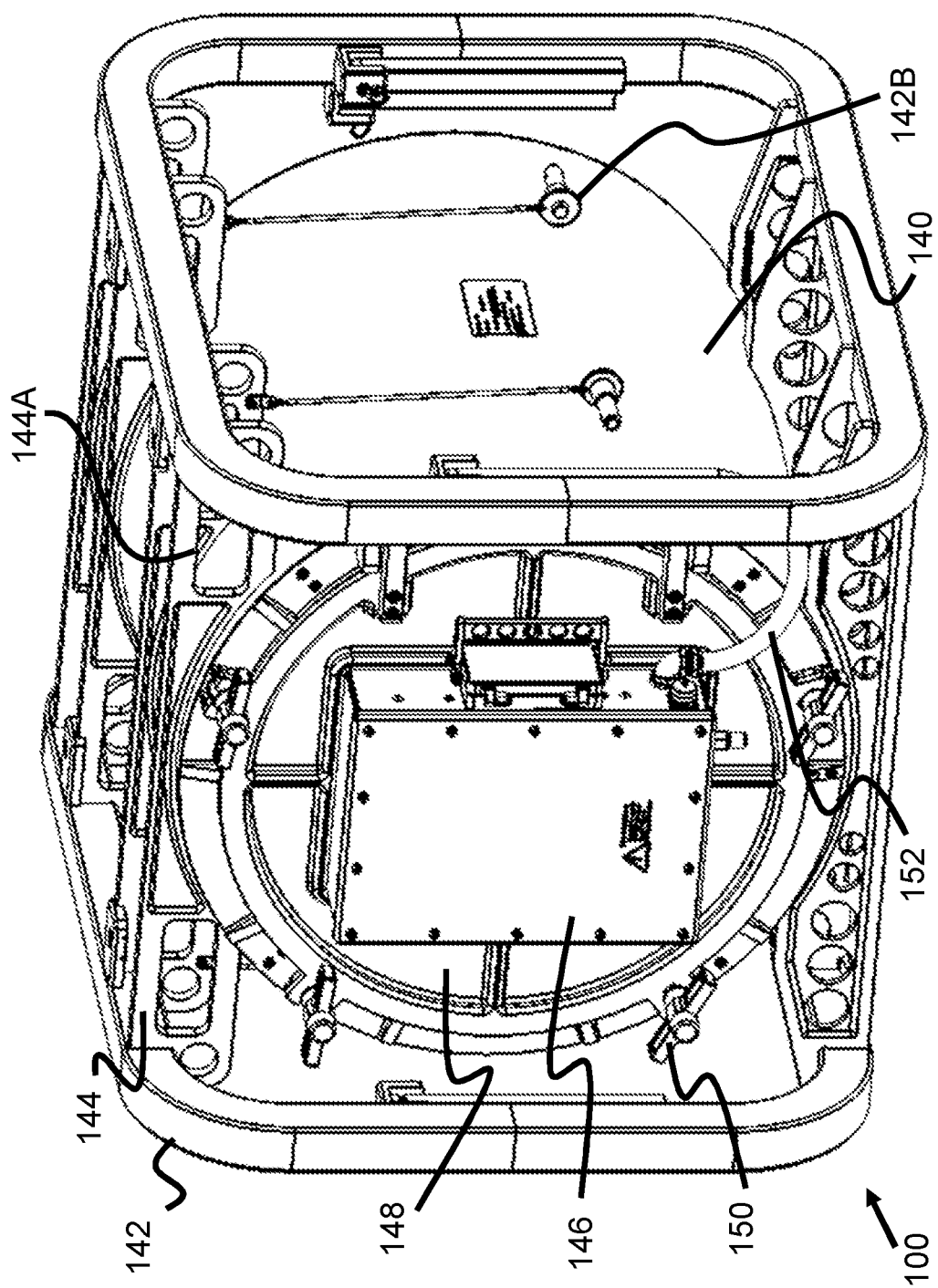
FIG. 4 is a perspective view of a fan blower assembly according to the present invention.
Figure 5:
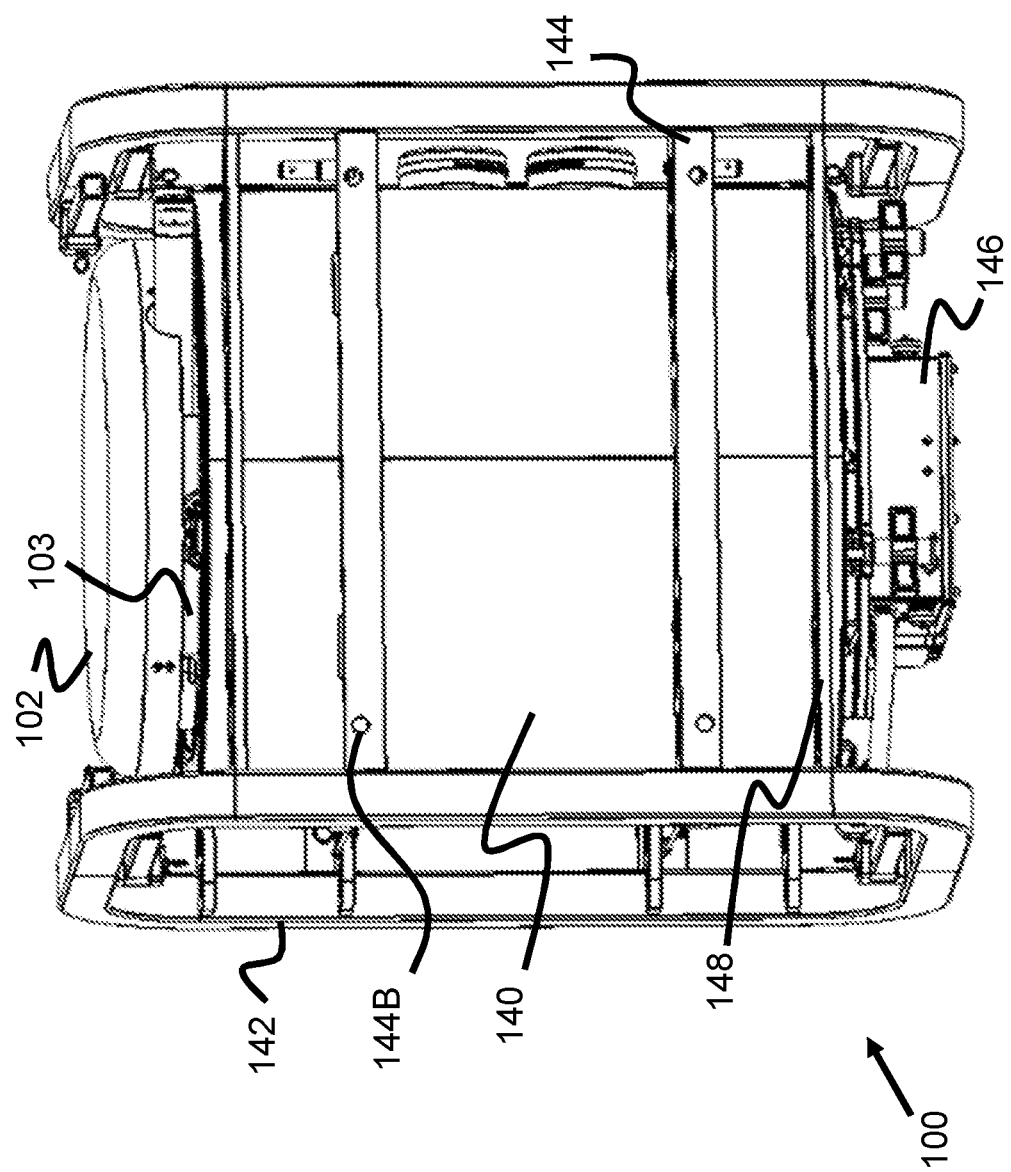
FIG. 5 is a bottom view of a fan blower assembly according to the present invention.
Figure 19:
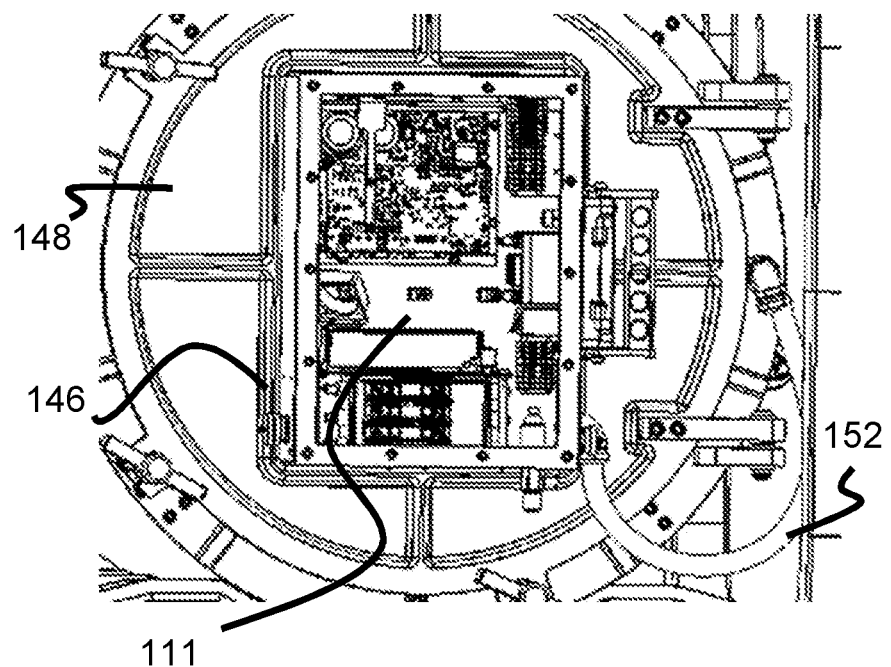
FIG. 19 illustrates a fan blower control system according to the present invention.

FIGS. 3-5 illustrate various external views of one embodiment of the fan blower 100. The fan blower 100 generally includes a tubular or cylindrical body 140 with two air output ports 110 along its side (FIG. 3). As seen best in FIGS. 3 and 5, an air inlet shroud 102 is positioned on a first end of the tubular body 140, leaving a gap 103 that the air can enter or be sucked into the fan blower 100. A second end of the tubular body 140 includes an air filter access door 148 (selectively attached via a hinge and wingnuts 150, and a fan blower control system housing 146, in which the fan blower control system 111 is located (se also FIG. 19). Attached to the fan blower control system housing 146 is wire conduit 152, which includes power and sensor wires connected at other locations on the fan blower 100.

The tubular body 140 is preferably fixed or supported by a framework comprising two generally square or rectangular support members 142 located along each side of the tubular body 140, and a plurality of perpendicular cross beams 144 (e.g., two top and two bottom) that connect to the support members 142 at both of their ends. Preferably, each of the cross beams 144 have a curved portion with a curvature matching the sides of the tubular body 140, thereby mating with and engaging the tubular body 140.

The top cross beams 144 may include horizontal apertures 144A aligned on their left and right sides, sized to allow the prongs of a forklift to pass through and thereby easily lift the fan blower 100 as necessary. The support members 142 may also include pivotally mounted handles 142A (e.g., two on each corner) that can allow several people to carry the fan blower 100.

The fan blower 100 is also preferably configured so that multiple fan blowers 100 can be stacked on to each other. As seen in FIG. 5, the top and bottom cross beams 144 can include vertical apertures 144B (e.g., one on the left and right). When stacked, the vertical apertures 144B of the bottom cross beams can be aligned with the vertical apertures 144B of the top cross beams of the lower fan blower 100. The attached stacking pins 142B can be placed through the aligned vertical apertures 144B, locking the two fan blowers 100 together.

Figure 6:
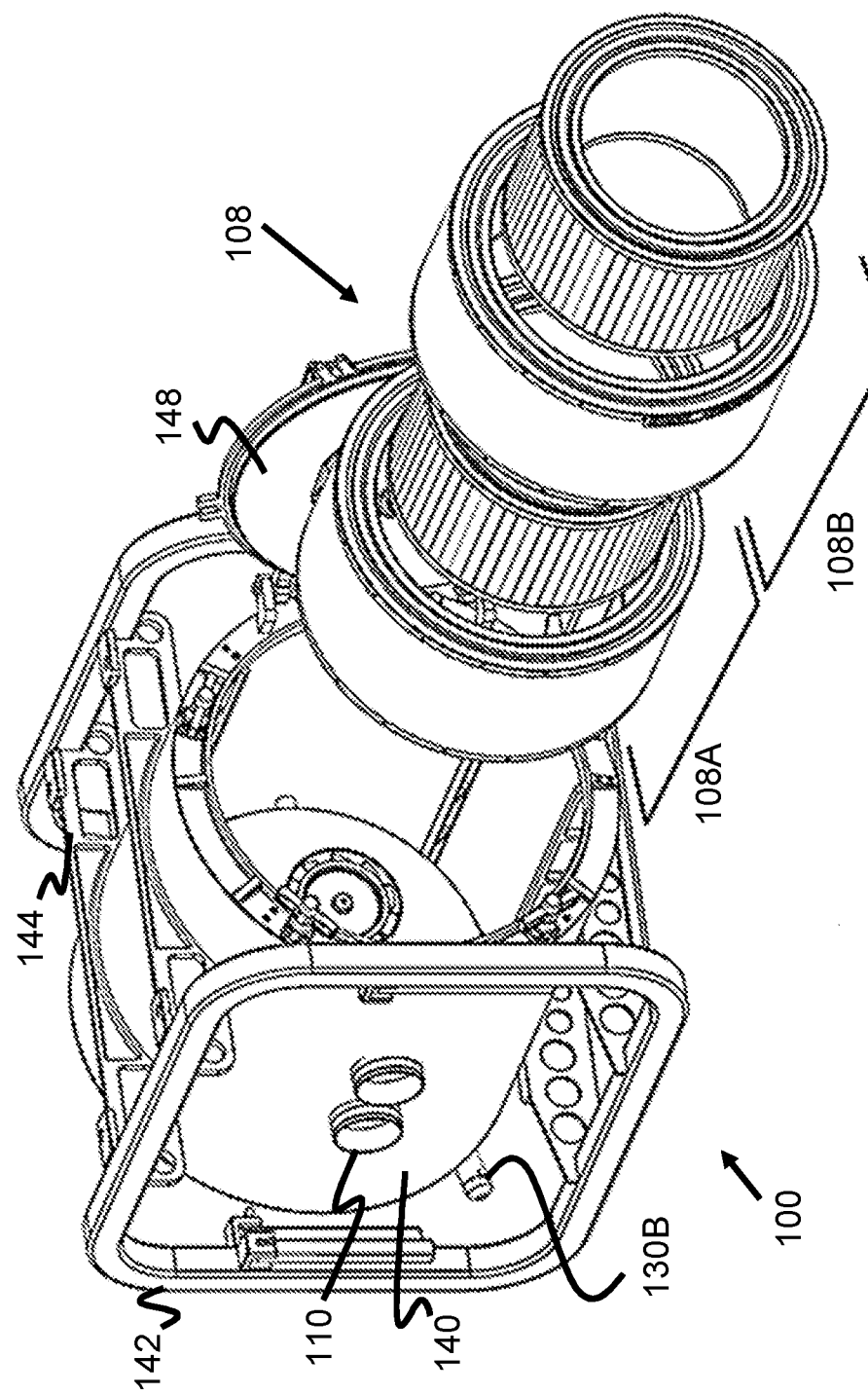
FIG. 6 is a perspective view of a fan blower assembly according to the present invention.
Figure 7:
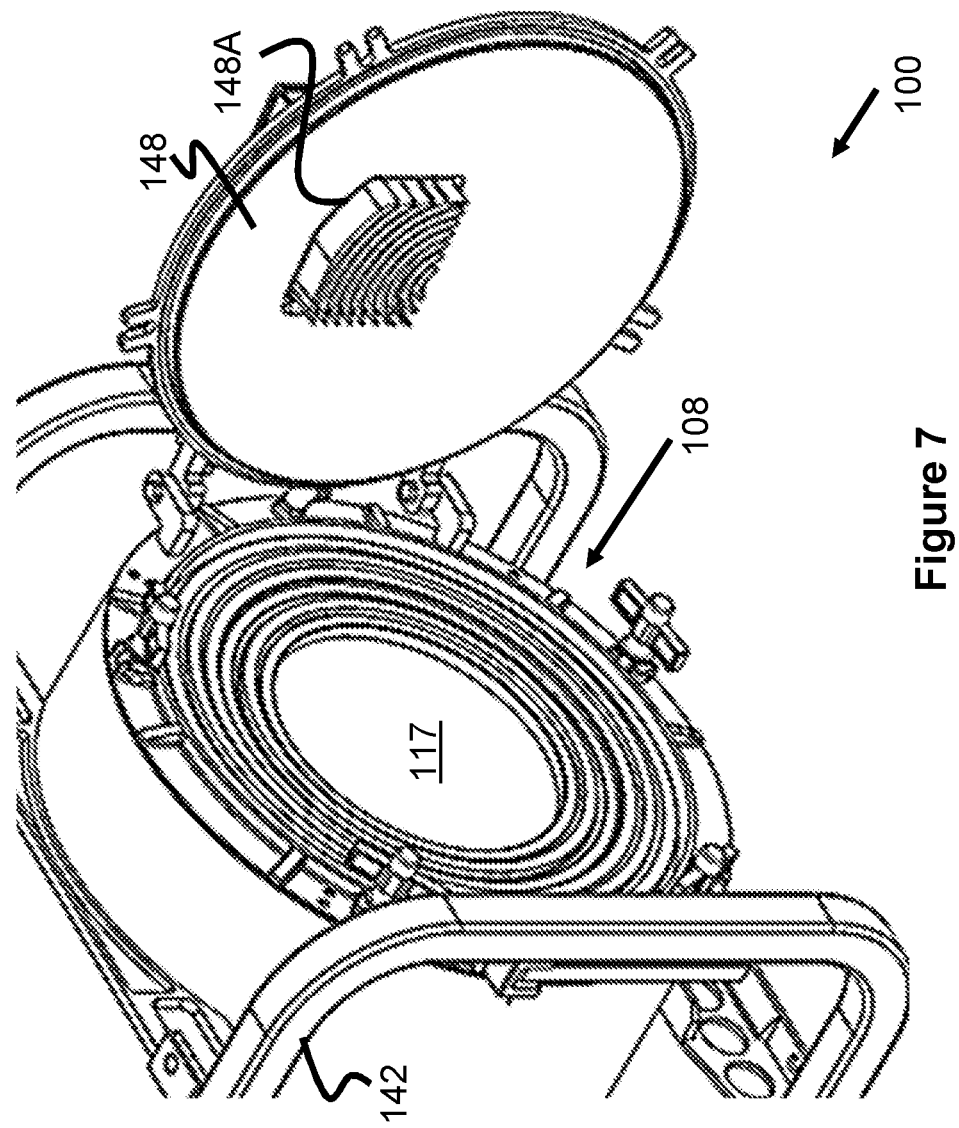
FIG. 7 is a perspective view of a fan blower assembly according to the present invention.

As seen in FIGS. 6 and 7, the air filter access door 148 can be opened to expose an interior of the fan blower 100, thereby allowing the user to install desired air filters 108. For example, and outer gas filter 108A and inner particulate filter 108B can be used. When the air filter access door 148 is closed, an air filter support structure 148A engages an end of the filters 108 to help maintain their positions within the fan blower 100.

Figure 8:
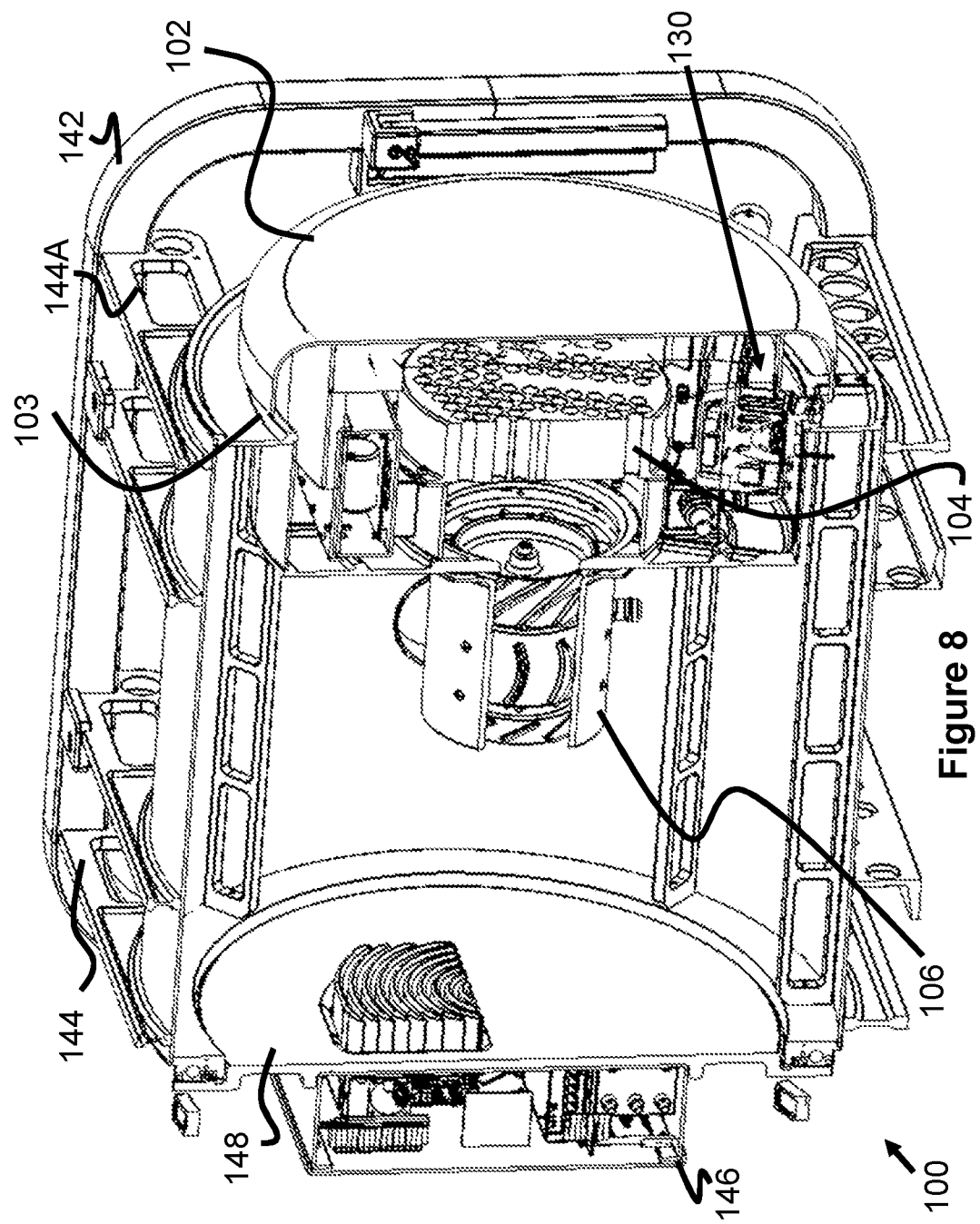
FIG. 8 is a cross sectional view of a fan blower assembly according to the present invention.
Figure 9:
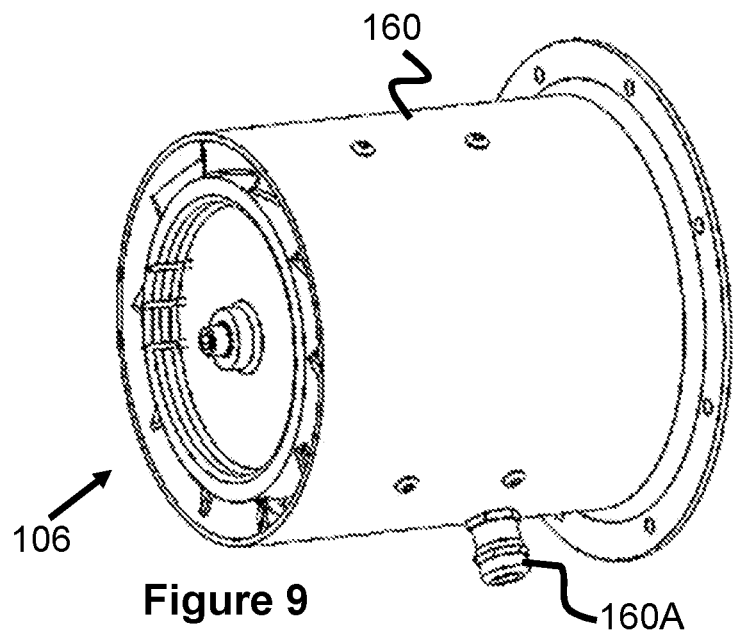
FIG. 9 illustrates a view of a fan assembly according to the present invention.
Figure 10:
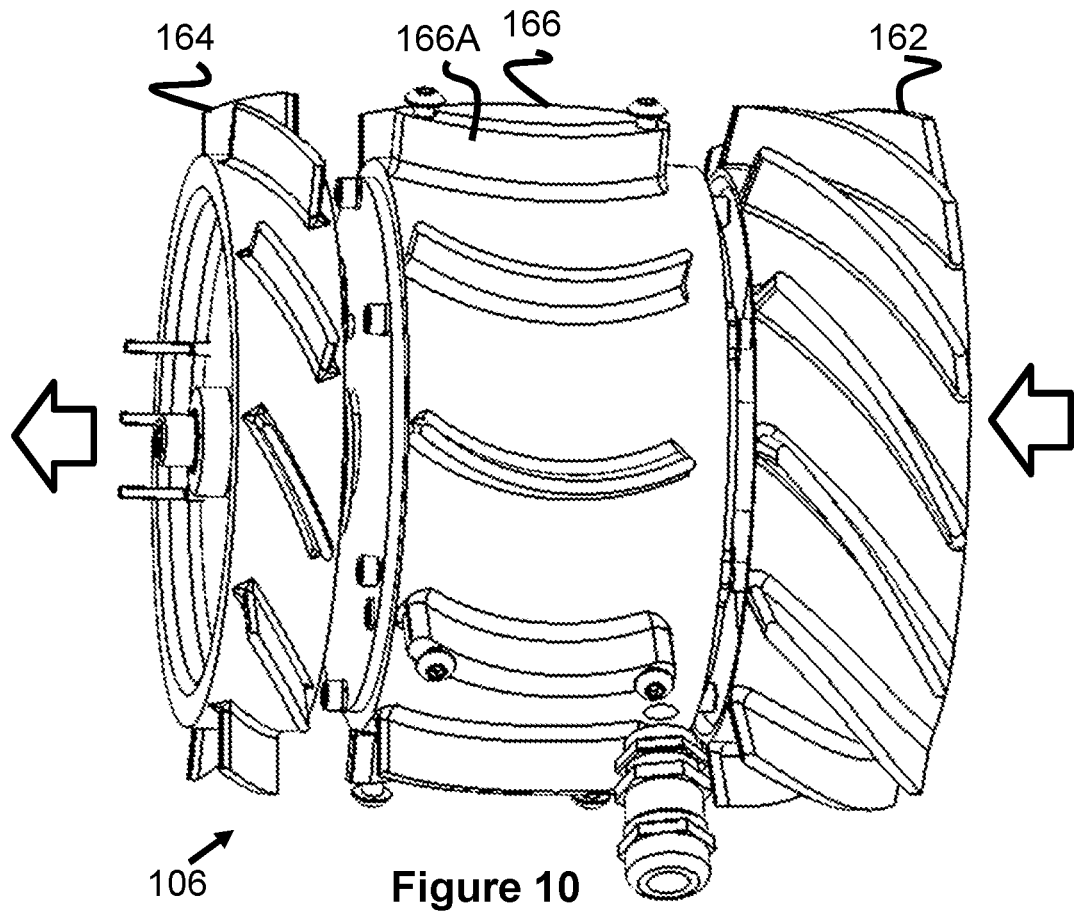
FIG. 10 illustrates a view of a fan assembly according to the present invention.
Figure 13:
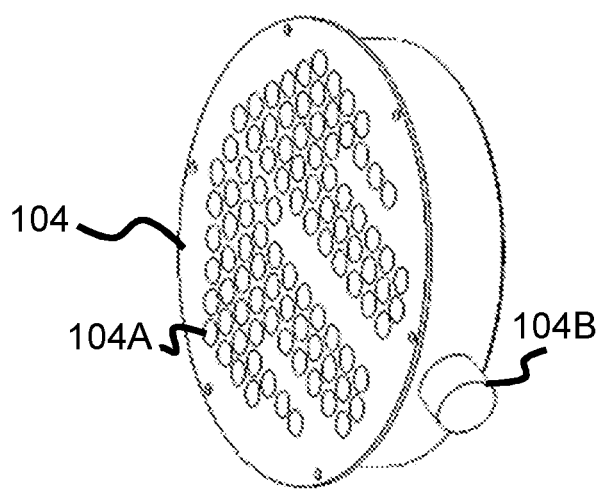
FIG. 13 illustrates an inertial particle separator according to the present invention.
Figure 16:
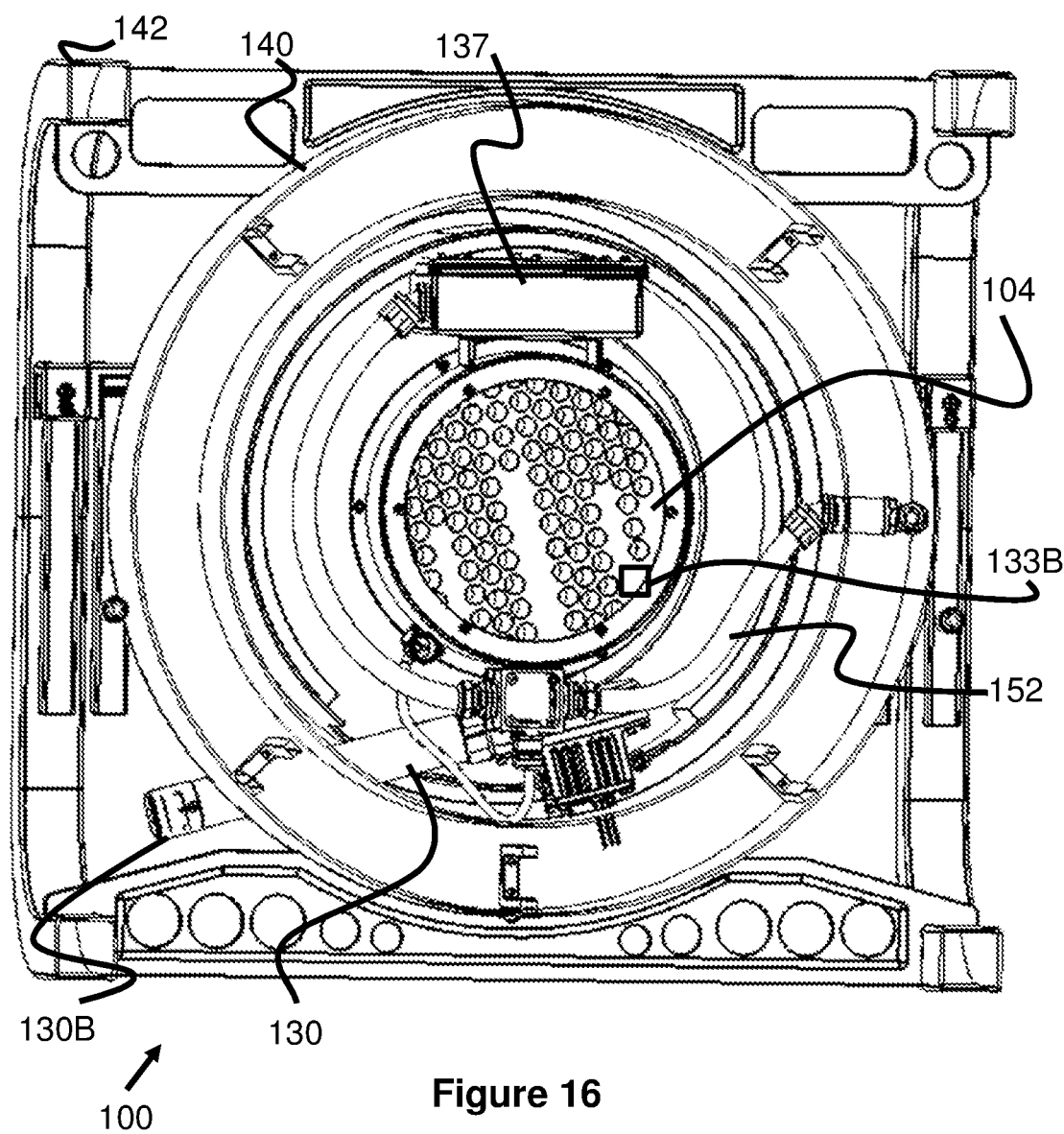
FIG. 16 illustrates a cross sectional end view of a fan blower according to the present invention.
Figure 17:
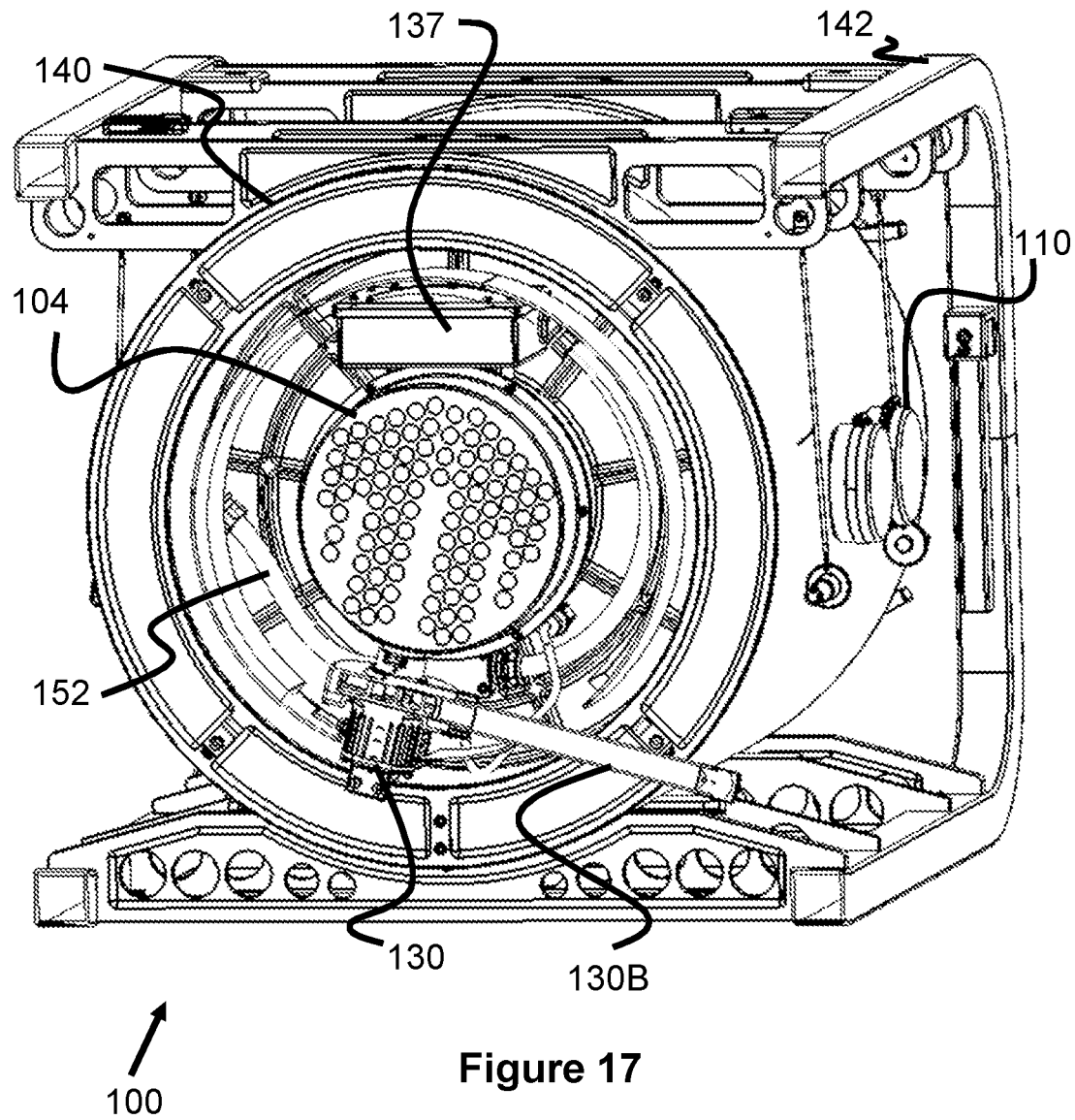
FIG. 17 illustrates a cross sectional end view of a fan blower according to the present invention.
Figure 18:
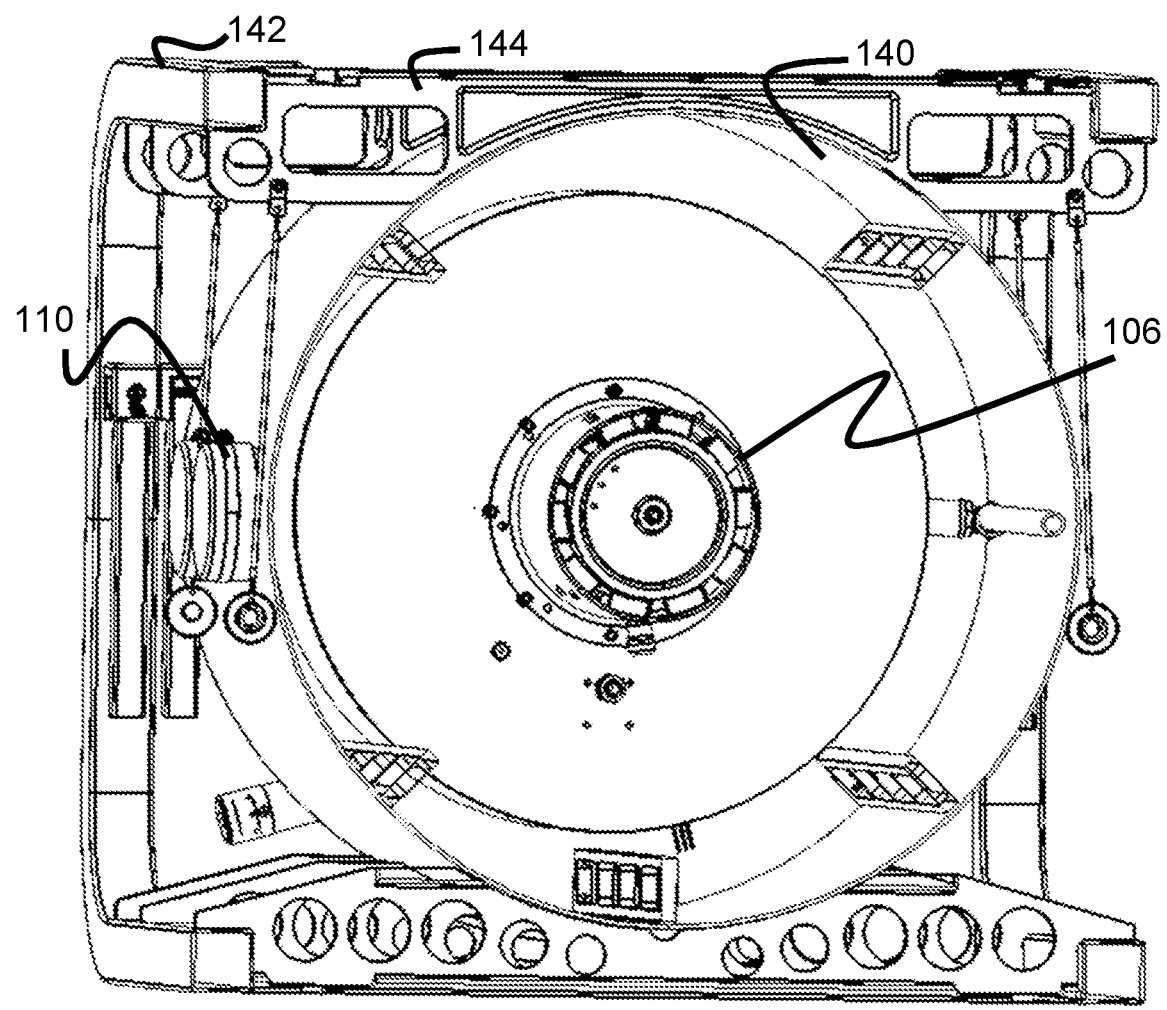
FIG. 18 illustrates a cross sectional end view of a fan blower according to the present invention.
Figure 20:
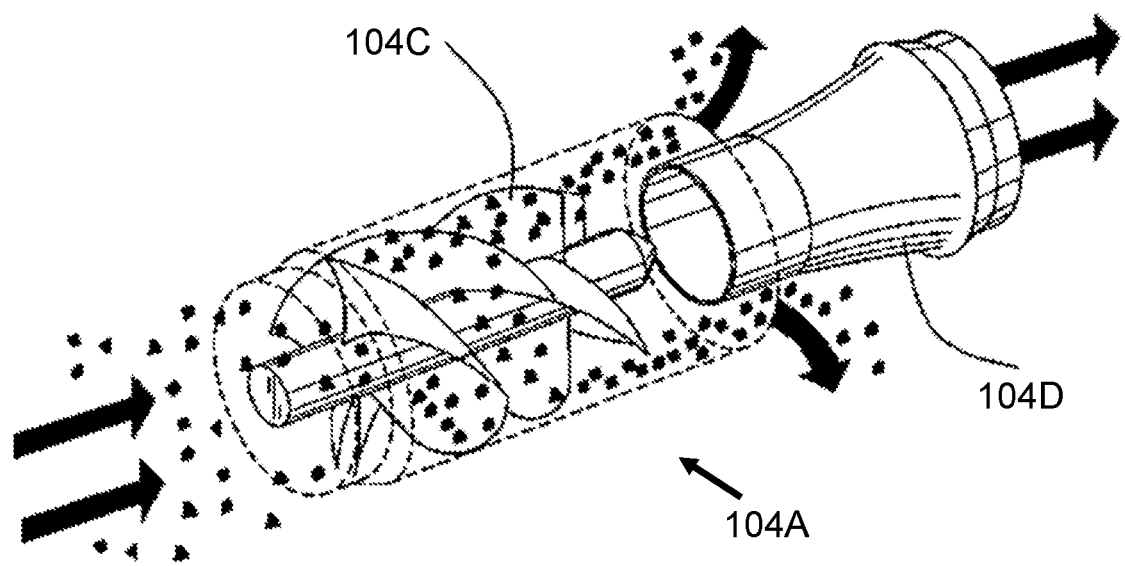
FIG. 20 illustrates a view of a portion of the inertial particle separator according to the present invention.

As previously described, air is sucked into the fan blower 100 through the circular gap 103 formed between the air inlet shroud 102 and the first end of the tubular body 140, as seen in FIGS. 8, 16, and 17. From there, air enters the inertial particle separator 104, which is also seen in FIG. 13. The inertial particle separator 104 includes a circular or tubular shape and a plurality of passages 104A along its forward face. As seen in FIG. 20, the passages 104A include helical fins 104C, which cause the air to spiral. This rotational motion causes the relatively larger particles in the air to move to the outer diameter of the passage 104A. A nozzle 104D is positioned at the end of the passage 104A, and includes an outer ramped surface that ejects the particles in a relatively tangential trajectory, while a central passage of the nozzle 104D allows the relatively particle free air to pass along a straight trajectory.

Figure 14:
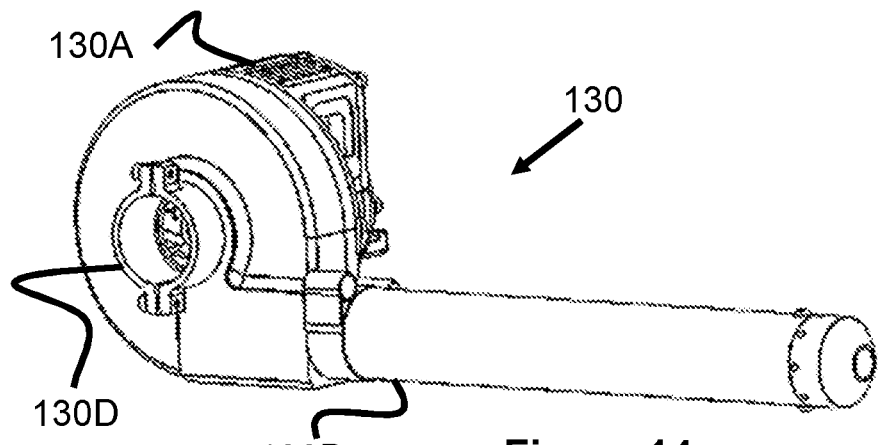
FIG. 14 illustrates a view of a scavenger fan according to the present invention.
Figure 15:
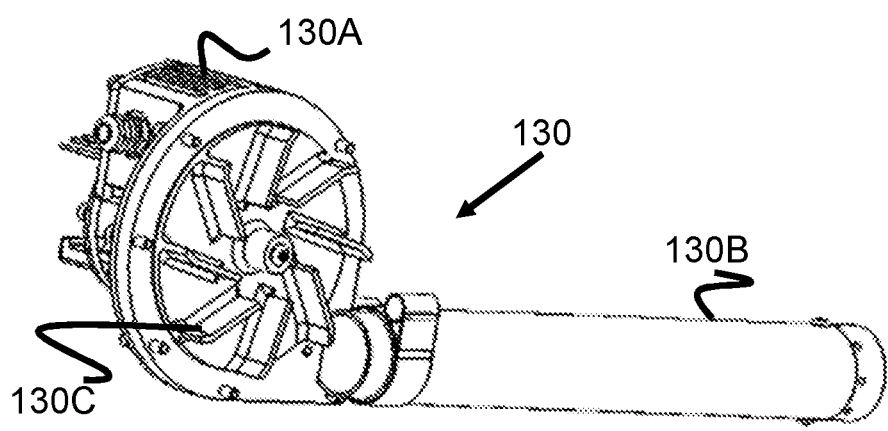
FIG. 15 illustrates a view of a scavenger fan according to the present invention.

The reduced-particle air continues relatively straight through the inertial particle separator 104 and the tangentially ejected particle-containing air is moved towards the circular walls of the inertial particle separator 104. As best seen in FIGS. 13, 14, and 17, the inertial particle separator 104 includes a lower exhaust port 104B that is connected to an inlet 130D of a scavenge fan blower assembly 130. The scavenge fan blower assembly 130 includes a motor 130A that drives rotation of a fan 130C, thereby sucking out the particle-containing air from the inertial particle separator 104 and ejecting it through the particle exhaust tube 130B to an exterior of the fan blower 100.

As seen in FIG. 17, the positioning of the scavenging fan blower assembly 130 allows for its particle exhaust tube 130B to eject particles early in the intake pathway, reducing any wear and increasing filter life that they may otherwise cause if filtered later in the process. Optionally, the particle exhaust tube 130 may be fitted with a noise suppressor on its end to decrease added noise.

The reduced-particle air continues is then sucked into and through the variable speed fan assembly 106, which is located inwardly adjacent to the inertial particle separator 104, as best seen in FIG. 8.

Preferably, the variable speed fan assembly 106 is a mixed flow fan assembly, seen best in FIGS. 9-12. The fan assembly 106 includes a forward, first fan 162 (i.e., closest to the inertial particle separator 104), a middle, stationary member 166, and a rearward, second fan 164. The first and second fans 162, 164 are fixed on an axle 171 and thereby rotate together, while the stationary member 166 remain stationary. The vanes or fins 166A of the stationary member 166 help to create relatively higher pressure and redirects the air flow along a more efficient, linear trajectory. Hence, the air is moved by a combination of aero-dynamic and mechanical pushing force, and the centrifugal action of spinning the air against the outer fan housing 160. The configuration of the fan assembly 106 may also provide negligible stall characteristics and therefore is well-suited for systems having high or variable resistance, such as filters.

Generally, axial flow fans have various blade shapes including Aerofoil, Sickle, Paddle, and Variable pitch. Axial fans are used for relatively high flow rates and low pressures with flow parallel to the axis of fan and are often selected for simple extraction or cooling applications with very low system resistance, such as moving air from one large space to another (i.e. from factory to outside), desk fans and condenser cooling in refrigeration.

Centrifugal flow fans have relatively low flow rates and high pressures with flow perpendicular to blower axis. Air enters around center of the fan and exits around the outside. Fans with backward curved blades produce less air volume than axial fan, but generate considerably more pressure and are the least hungry for power in the centrifugal range. Typical applications for centrifugal fans include air handling units, process heating and cooling, electronic cooling and boiler combustion air.

Mixed flow fans combine the high flow of an axial fan with the high pressure of a centrifugal fan. It provides a solution where combined high pressure and flows are a requirement. It consists of two spinning fan blades at two ends and a stationary vane in the middle. The stationary vane creates higher pressure and adds efficiency by redirecting the air flow created from the spinning fan blade. They may be considered vane-axial fans, but the impeller is shaped like a bevel gear, where the fan blades are designed with an angle. This means the air is moved by a combination of aerodynamic/mechanical pushing of air, and the centrifugal action of spinning the air against the housing. Mixed flow fan tends to be quieter than other types because of their efficiency and that their moving parts are partially blocked by the shroud.

In one embodiment, the first fan 162 and the second fan 164 have fins that are substantially angled, relative to an axis of the fan assembly 106, in a first angular direction. In one embodiment, the fins 166A of the stationary member 166 have a concave shape oriented in a first radial position. In another embodiment, the first and second fans 162, 164 are about 6 inches in diameter, as opposed to about 20 inches or more on prior art designs, due to the efficiency of the mixed flow fan design.

Motors in prior art air filters/blowers have utilized AC induction motors, likely due to several limitations inherent in permanent magnet motors. For example, permanent magnet motors can exhibit "cogging" at startup from the interaction of the rotor magnets and stator windings due to harmonics. This cogging, in turn, causes noise, vibration, and non-uniform rotation, which is undesirable for fan blowers, and especially those that vary their fan speed. Additionally, high current or operating temperatures can cause the magnets of the motor to lose their magnetic properties permanently.

The variable speed fan assembly 106 preferably uses a permanent magnet motor by at least partially addressing the above limitations and therefore taking advantage of other advantages these motors have over their AC induction counterparts. Specifically, the motor can include a relatively high number of poles than an equivalent AC induction motor to help overcome the cogging-related issues. Further, by using a more efficient mixed flow fan 106, less current is required than with an equivalent AC induction motor. In contrast, the use of the permanent magnet motor allows for greater efficiency than an AC induction motor, lower operating temperatures, reduced wear, and a smaller physical size (i.e., due to the higher flux density of permanent magnets vs. AC windings).

Figure 11:
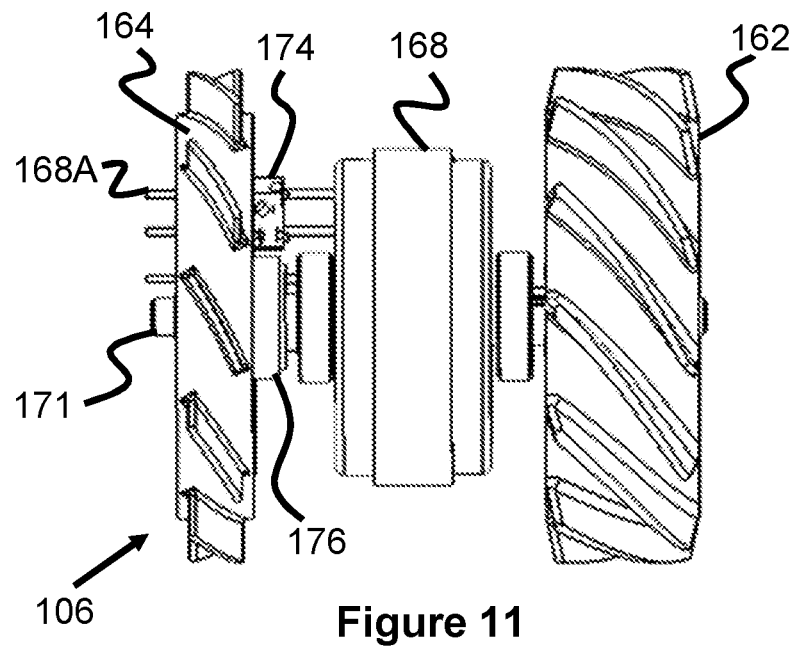
FIG. 11 illustrates a view of a fan assembly according to the present invention.

Power to the fan assembly 106 is supplied though a wire conduit connected to port 160A on the outside of the fan housing 160 from inductors 137. As seen in FIG. 11 (with the stationary member 166 removed), power is supplied to the windings of the stator 168 (from port 160A to the stator pins 168A), held in place by the motor bushings 172. When power is supplied to the stator 168, it generates a magnetic field that acts on the magnets in the rotor and magnetic retention band 170 (seen in FIG. 12 with the stator 168 removed). Since the rotor 170 is fixed to the axle 171, it causes the axle 171 and fans 162 and 164 to rotate.

Figure 12:
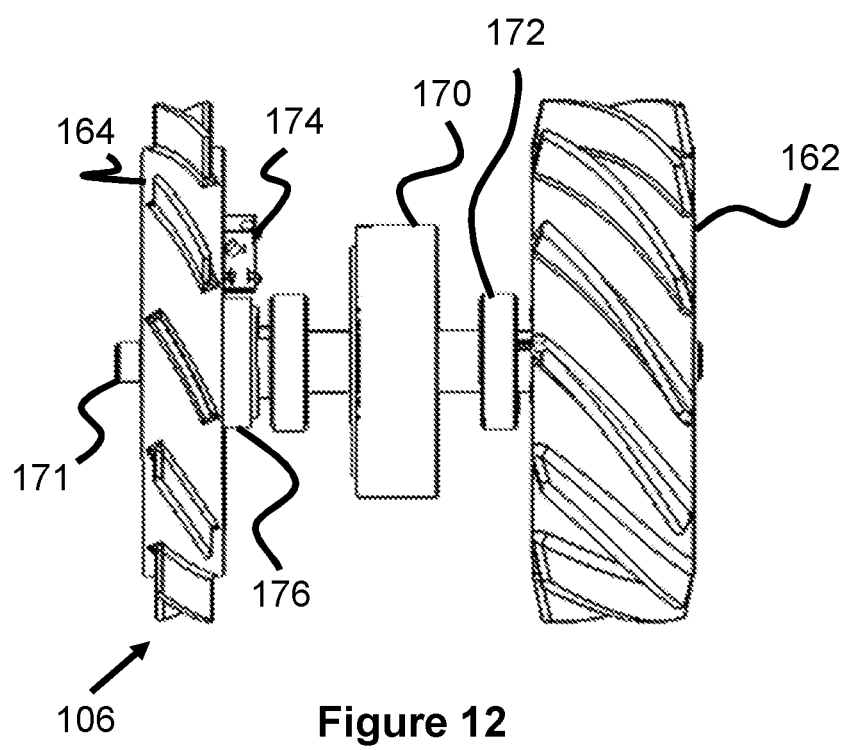
FIG. 12 illustrates a view of a fan assembly according to the present invention.

As best seen in FIGS. 11 and 12, the fan assembly 106 further includes a magnetic encoder ring 176 and a magnetic encoder reader 174. The reader 174 monitors the rotational speed of the ring 176 and relays that information back to the microprocessor 112 to ensure the fan assembly 106 is operating at the desired speed.

Once the air passes through the fan assembly 106, it enters into the space 117 within the filters 108 (FIG. 7). The continued pressure from the fan assembly 106 forces the air through the filters, which provide additional filtering, and finally through the air output ports 110, which are connected to various tubes and ventilations passages, depending on their use.

Figure 22:
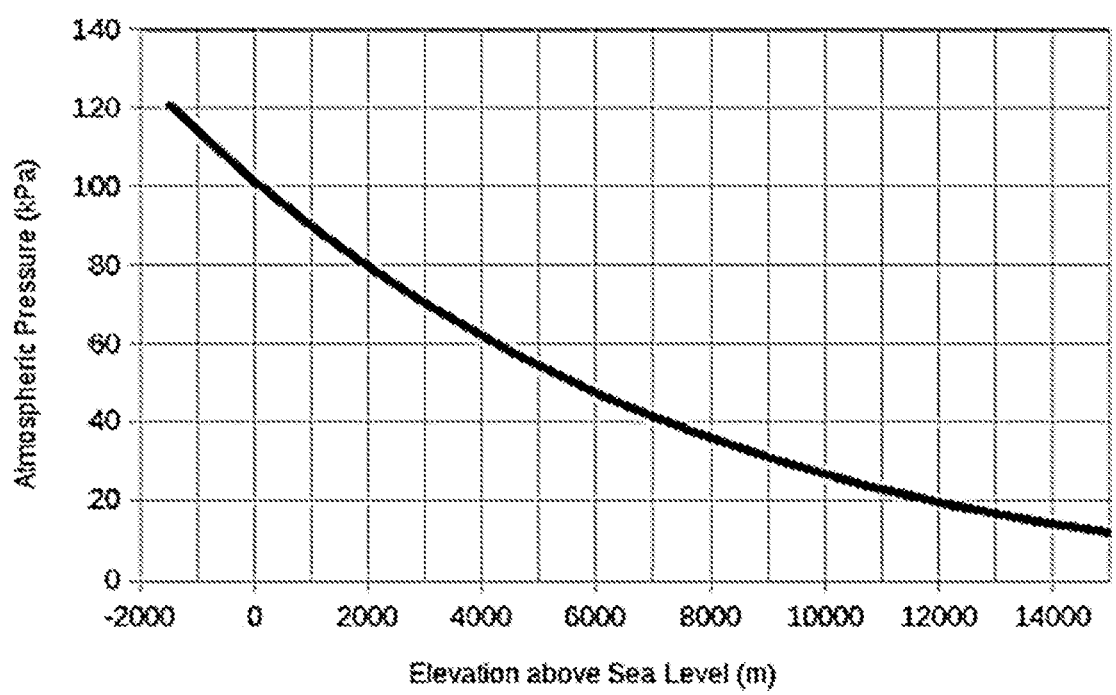
FIG. 22 illustrates a graph representing a relationship between atmospheric pressure and elevation.

As previously discussed, the microcontroller 112 compensates for different elevations by increasing or decreasing the speed of the fan assembly 106. In one embodiment, the sensor 126 is a barometric pressure transducer. As seen in FIG. 22, there is a general correlation between the barometric pressure and elevation, allowing for a rough altitude estimate to be generated. That altitude can then be used to determine the speed of the fan assembly (e.g., via a predetermined equation) and thereby provide a consistent air flow through the blower 100, regardless of altitude.

Figure 21:
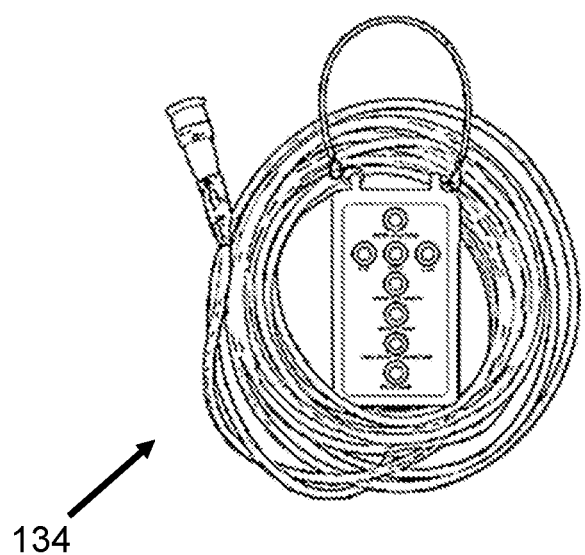
FIG. 21 illustrates a view of a remote control for a fan blower according to the present invention.

As previously discussed, the microcontroller 112 can be controlled via a local user interface 132 on the fan blower 100 itself or via a remote control 134 (e.g., FIG. 21) that connects to the fan blower control system 111 via an external port on the fan blower control system housing 146. In one example, these controls include Start, Stop, Flow Rate, Configuration (thresholds for chemical/biological sensor alerts), and Saturation Warning (the maximum fan speed reached without meeting the desired flow rate).

In one embodiment, the fan blower 100 includes one or more chemical and/or biological detection sensors 133 in communication with the fan blower control system 111, as seen in FIG. 2. For example, the fan blower 100 may include a sensor 133B upstream of the inertial particle separator 104 to monitor incoming air (FIG. 16), a sensor 133A downstream of the filters 108 and near the air outlet ports 110 to monitor outgoing air (FIG. 3), or at both locations. In this regard, the fan blower control system 111 can determine if contaminated air is entering the blower 100, if contaminated air is exiting the blower 100, and if the blower 100 is filtering air properly. Similarly, a non-hazardous chemical agent (e.g., R134a refrigerant gas or DMMP gas) can be intentionally introduced near the fan blower 100 to test if various components are installed/functioning properly (e.g., filter installation) and to measure how much of the chemical is being removed. The control system 111 may issue an indication (e.g., sound, light) via the remote control 134 and user interface 132 to alert a user to a filtering problem and/or can immediately cut power to the fan blower 100 (or to the fan assembly 106) to prevent downstream contamination.

In one embodiment, the sensors are any of those found in U.S. application Ser. No. 13/468,945 entitled System and Method for Chemical and/or Biological Detection, and is herein incorporated by reference.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A fan blower for providing chemically and/or biologically filtered air, comprising:
   a blower enclosure having an air inlet, an air outlet, and an internal cavity; and,
   a fan assembly positioned within said internal cavity to move air from said air inlet out through said air outlet; said fan assembly comprising a mixed flow fan and a permanent magnet motor coupled to and driving rotation of said mixed flow fan;

an atmospheric pressure sensor in communication with ambient air outside said fan blower;

a static air pressure sensor in communication with said internal cavity;

a first chemical and biological agent sensor;

a microprocessor configured to adjust a speed of said fan assembly based on sensor readings of said atmospheric pressure sensor and sensor readings of said static air pressure sensor; and said microprocessor being configured to trigger an alarm based on data from said first chemical and biological agent sensor;

an inertial particle separator disposed adjacent to, and upstream of said mixed flow fan; and, a scavenge fan connected to said inertial particle separator that removes separated, particle-containing air from said inertial particle separator; said scavenge fan further comprising an exhaust tube having an outer, open end positioned outside of said fan blower, so as to expel said particle-containing air from said fan blower.

2. The fan blower of claim 1, wherein said mixed flow fan comprises a first fan connected to a second fan via a common axle, and a plurality of stationary vanes located on a stationary member and being disposed between said first fan and said second fan.

3. The fan blower of claim 2, wherein said permanent magnet motor further comprises a motor stator connected to said stationary member, and a permanent magnet rotor fixed to said common axle and disposed radially inwards of said motor stator.

4. The fan blower of claim 2, wherein said first fan and said second fan have a diameter of about 6 inches.

5. The fan blower of claim 1, wherein said first chemical and biological agent sensor is positioned adjacent to said air outlet of said blower enclosure.

6. The fan blower of claim 5, further comprising a second chemical and biological agent sensor positioned adjacent to said air inlet of said blower enclosure and said microprocessor being configured to compare sensor readings of said first chemical and biological agent sensor and said second chemical and biological detection sensor.

\* \* \* \* \*